United States Patent Office 3,417,107
Patented Dec. 17, 1968

3,417,107
NAPHTHOSPIROFURAN COMPOUND
Saul Chodroff, Brooklyn, and Ram S. Vazirani, New York, N.Y., assignors to Norda Essential Oil and Chemical Co., Inc., New York, N.Y., a corporation of New York
No Drawing. Filed Aug. 17, 1966, Ser. No. 572,896
8 Claims. (Cl. 260—346.1)

ABSTRACT OF THE DISCLOSURE

A new olfactive type of compound or mixture of isomers which is characterized by a dimethyl perhydronaphthospiro furan structure having a unique woody-ambergris note and valuable fixative properties is made starting from myrcene and a lower dialkyl itaconate. The compound or mixture of isomers of this invention is unusually tenacious, softens harsh notes in perfumes and allows the perfumes to diffuse uniformly over a longer period than other similar products.

BACKGROUND OF INVENTION

Odorants of the ambergris type are important materials in perfumery and a variety of such compounds is known. Generally, however, such compounds have heretofore been obtainable only by means of complicated synthesis, often requiring rather complex products of natural origin such as certain ionone derivatives or sclareol or sclareol oxide as starting materials. Moreover, in many instances such products have had inadequate odor strength or persistence. U.S. Patents 2,803,662; 2,809,996 and 3,029,255 are representative of this state of the art. More recently some work was also done on the synthesis of compounds having an amber aroma starting from more simple chemical structures such as myrcene which can be converted into a variety of products by Diels-Alder condensation with an unsaturated dienophilic compound such as an aldehyde, a ketone, a carboxylic acid or an ester thereof. U.S. Patent 2,933,506 is representative of this kind of effort, but the products obtained in this manner have usually been characterized by a violet aroma lacking the ambergris tone which is considered particularly desirable.

In still other work, described in British Patent 881,535, a compound having a desirable type of ambergris tone has been prepared via a reaction involving a Diels-Alder condensation of myrcene with citraconic anhydride. However, while the tone of this product has been found desirable it lacked in fixation qualities or persistence.

SUMMARY OF INVENTION

It has now been discovered that a product possessing a uniquely attractive ambergris note as well as a high degree of persistence in the form of an isomeric mixture of dimethyl perhydro naphtho spiro furans can be obtained by (1) condensing myrcene with itaconic acid or preferably with a derivative thereof such as a lower alkyl ($C_1$–$C_5$) ester, desirably in the presence of hydroquinone or some other conventional antioxidant such as a phenolic compound which minimizes wasteful polymerization of the diolefin; (2) cyclizing the methyl pentenyl cyclohexene moiety of the resulting product in the presence of a strongly acidic cyclizing catalyst such as boron trifluoride etherate, concentrated phosphoric acid, sulfuric acid and the like, thereby forming a dimethyl octahydronaphthalene structure which has the itaconic residue (in the form of a carboalkoxy radical, —COOR, and of a methanocarboalkoxy radical, —CH₂COOR), attached to one carbon atom of the erstwhile cyclohexene ring; (3) reducing this itaconic residue to the corresponding methanohydroxy and ethanohydroxy radicals, —CH₂OH and —CH₂CH₂OH, preferably in the presence of a selective reducing agent such as a dialkyl aluminum hydride, lithium aluminum hydride or, less desirably, by high pressure hydrogenation in the presence of a catalyst such as copper chromite; (4) dehydrating the resulting methanohydroxy and ethanohydroxy radicals in the presence of an acid dehydration catalyst such as sulfuric acid, phosphoric acid or preferably toluene sulfonic acid to form a spiro tetrahydro furan ring therefrom; and (5) fully saturating the octahydronaphthalene ring by selective catalytic hydrogenation, e.g., in the presence of a palladium catalyst.

DESCRIPTION OF ILLUSTRATIVE EMBODIMENT

Starting, for instance, from myrcene and di-n-propyl itaconate the desired product or isomeric mixture of products can be obtained by the following sequence of reactions:

I. Diels-Alder condensation of myrcene and di-n-propyl itaconate

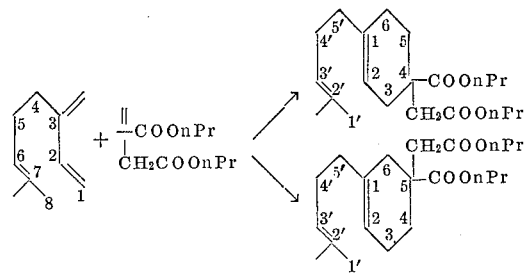

In carrying out this reaction a mixture of 531 gm. of redistilled commercial myrcene (about 3.3 moles myrcene, the remainder being other unsaturated hydrocarbons which do not take part in the condensation), 451 gm. of dry meta xylene and 5.4 gm. of hydroquinone was stirred and heated to reflux in a nitrogen atmosphere in a 3-liter, 3-necked flask equipped with a stirrer, dropping funnel, thermometer, nitrogen inlet and condenser. 642 gm. (3 moles) of di-n-propyl itaconate were gradually added at reflux over a period of 1½ hours, and reflux was continued for an additional 15 hours, the internal temperature rising from 158° to 169° C. The material was transferred to a distillation flask equipped with a short (4″) Raschig ring packed column and vacuum distilled. After removal of the xylene and unreacted components the recified substituted cyclohexane product was collected in 768 gm. yield (73% of theory). It was characterized by a boiling range from 170° to 190° C./0.5 mm. and a refractive index $n_D^{20}$ of 1.4808.

The product from this reaction is a mixture of 1-(2′-methyl-2′-pentenyl)-4-carbopropoxy - 4 - methanocarbopropoxy-$\Delta^{1,2}$-cyclohexene and the isomer 1-(2′-methyl-2′-pentenyl) - 5 - carbopropoxy - 5 - methanocarbopropoxy-$\Delta^{1,2}$-cyclohexene. In carrying out this reaction it is important to keep the reaction temperature moderate, e.g., between about 100° C. and about 170° C., and preferably between about 150° C. and 170° C. This minimizes isomerziation of the itaconic acid structure to citraconic and mesaconic structures which result in much less desirable end products. It is for this reason that it is preferred to use in the reaction mixture a suitably low-boiling nonreactive solvent at a concentration such that the reaction temperature is maintained at the desired level.

II. Cyclization of the substituted cyclohexene

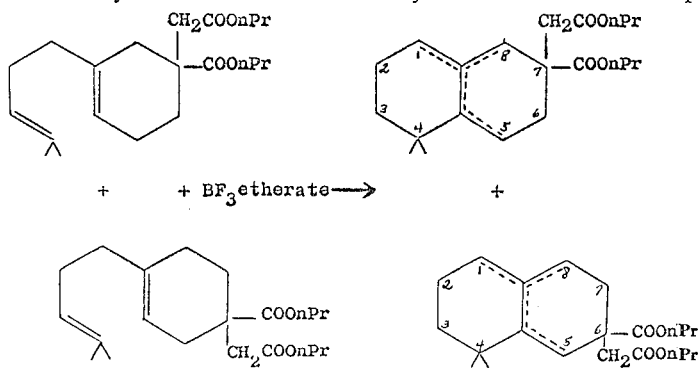

To carry out this conversion, a 3-liter, 3-necked round bottom flask fitted with an agitator, thermometer, reflux condenser an additional funnel, was charged with 800 ml. of anhydrous toluene containing 8 ml. of boron trifluoride etherate. The solution was heated to reflux and to the stirred refluxing solution were added 734 gm. of the crude rectified substituted cyclohexenes from Step I in a one hour period. At the end of the addition, 8 ml. of boron trifluoride etherate were added to the refluxing mixture (internal temperature 124° C.), and heating and refluxing was continued for an additional 2.5 hours. The resulting dark mixture was then cooled to 65° C. and 150 ml. of water were added in 10 minutes with agitation. The aqueous phase was discarded and the organic layer washed four times with 200 ml. of water in a separatory funnel until the aqueous layer was no longer acidic to litmus paper. The solvent was removed under vacuum (50 to 100 mm.) on the steam bath and the residue distilled under high vacuum, collecting 691 gm. This product is essentially an isomeric mixture of 4,4-dimethyl-6(7)-carbopropoxy - 6(7) - methanocarbopropoxyoctahydronaphthalenes and comprises a number of isomers differing from each other in the position of the double bond in the bicyclic ring system. It was characterized by a boiling point of 175°–180° C./1 mm.; a refractive index $n_D^{20}$ of 1.4850, and a specific gravity (25/25) of 1.0175.

III. Reduction of the dicarboxylated octahydronaphthalene

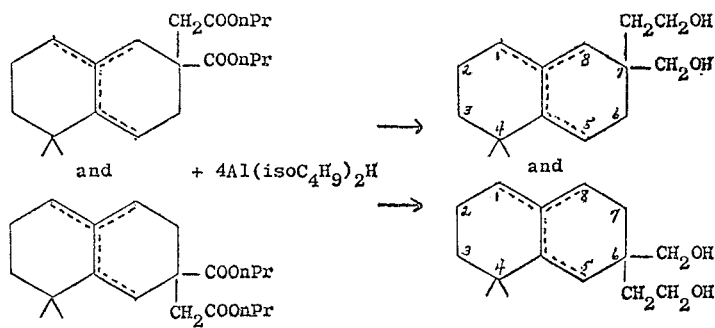

In carrying out this third step, a 5-liter, 3-necked flask equipped with stirrer, reflux condenser, dropping funnel, thermometer and nitrogen inlet was charged with 1072 gm. of a 25% solution of diisobutyl aluminum hydride in an inert hydrocarbon solvent (toluene), maintained in a nitrogen atmosphere and heated to a pot temperature of 40°–50° C. while stirring. 156 gm. of the 4,4-dimethyl-6(7)-carbopropoxy - 6(7) - methanocarbopropoxyoctahydronaphthalene product from Step II was added to the stirred mixture in one-half hour, maintaining the stated internal temperature by external cooling with a cold water bath. The solution was brought to reflux and maintained at reflux for 4.5 hours. The reaction mixture was cooled to 35°–40° C. with a methanol-Dry Ice bath and 35 ml. of isopropyl alcohol were added dropwise at 40°–45° C., with external cooling to destroy the excess diisobutyl aluminum hydride. The aluminum complex was hydrolyzed and dissolved by the slow (1–2 hour) addition of a solution of 174 ml. of concentrated sulfuric acid in 2450 ml. of water at an internal temperature of 40°–45° C. maintained by external cooling. All operations were carried out in an inert nitrogen atmosphere. Stirring was continued for one-half hour after the addition of the acid was completed. The aqueous layer was separated and discarded, and the toluene layer washed four times with 150 ml. of water to neutrality. The toluene was removed in vacuo on the steam bath and the residue was distilled at high vacuum, yielding 103 gms. of a high viscous colorless liquid. This product was essentially an isomeric mixture of the diols 4,4-dimethyl-6(7)-methanohydroxy-6(7)-ethanohydroxyoctahydronaphthalenes. The residual ester content was less than 2% by analysis. The product had a boiling point of 158–165° C./0.3 mm.

IV. Dehydration of the octahydronaphthodiol

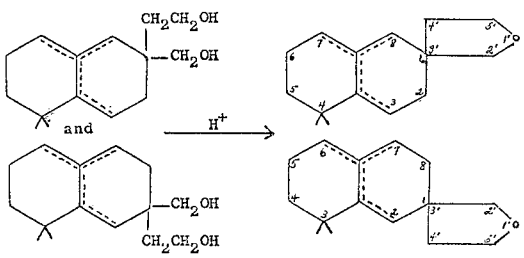

To convert the diol to a spirotetrahydrofuran ring, a 3-liter, 3-necked round bottom flask fitted with an agitator, Dean-Stark trap, and reflux condenser was charged with 500 gm. of the diol from Step III, 1200 ml. of anhydrous toluene and 18 gm. of para-toluene sulfonic ("tosyl") acid. The mixture was stirred under reflux for 5 hours during which time 32 ml. of water were collected in the Dean-Stark trap (90% of theory). The reaction mixture was cooled to 50° C. and washed four times with 200 ml. of water to remove the tosyl acid, and the solvent was removed in vacuo (100 mm.), yielding 400 gms. of product. The residue, when vacuum distilled, had a boiling point of 135°–148° C./4 mm., a refractive index $n_D^{20}$ of 1.5115, and a specific gravity (25/25) of 0.9816. The product essentially consisted of 4(3),4(3)-dimethyl octahydronaphthospiro-1,3′-tetrahydrofurans.

V. Hydrogenation of the octahydronaphthospirotetrahydrofuran

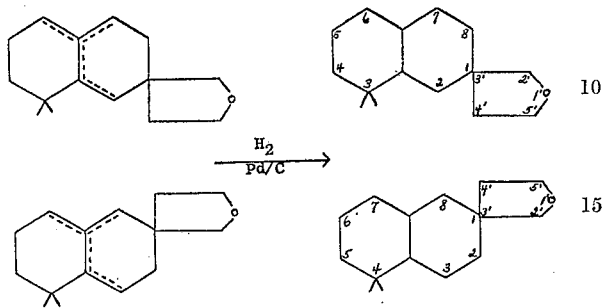

In the last step, 90 gm. of the naphthospirotetrahydrofuran from Step IV in 200 ml. of isopropyl alcohol and 5 gm. of 5% palladium on carbon as catalyst were charged in a 500 ml. pressure bottle and installed in a Parr hydrogenator. Reduction was carried out at 90° C. and 60 p.s.i. hydrogen pressure and was completed in eight hours. The catalyst was filtered, the solvent removed and the residue was distilled in high vacuum collecting 81 gm. of 4(3), 4(3)-dimethyl perhydronaphthospiro-1,3′-tetrahydrofurans as the end product. This product had a boiling point of 97°–99° C./0.4 mm., a refractive index $n_D^{20}$ of 1.4975 and a specific gravity (25/25) of 0.9703. It had a pronounced woody-ambergris note and excellent fixative properties in perfume formulations.

In testing the odor persistence of this product in the usual empirical manner by impregnating a test paper with the concentrated product and periodically determining the odor of the paper, it was found that the characteristic odor persisted for 7 to 8 days. By contrast, the previously known and closely similar trimethyl dodecahydronaphthofuran(2,3-C), which is a derivative of citraconic acid was less persistent when similarly tested. It should be understood that these odor persistence tests made with the olfactive compounds in concentrated form are commonly relied on in the art as a measure of the odor persistence of the same compounds when used in dilute form in practical perfume formulations.

It should be understood that the foregoing examples have been given principally for purposes of illustrating the invention, and not for limiting it. The scope of the invention which is to be protected is particularly pointed out in the appended claims.

What is claimed is:

1. As a composition of high odor persistence and adapted to soften harsh notes in perfume, a compound selected from the group consisting of 4,4-dimethyl perhydronaphthospiro-1,3′-tetrahydrofuran, 3,3-dimethyl perhydronaphthospiro-1,3′-tetrahydrofuran and mixtures of same.

2. As a composition of matter, 4(3),4(3)-dimethyloctahydronaphthospiro-1,3′-tetrahydrofuran.

3. As a composition of matter, 4,4-dimethyl-6(7)-carbopropoxy - 6(7) - methanocarbopropoxyoctahydronaphthalene.

4. As a composition of matter, 4,4-dimethyl-6(7)-methanohydroxy - 6(7) - ethanohydroxyoctahydronaphthalene.

5. A process for making 4(3),4(3)-dimethyl perhydronaphthospiro-1,3′-tetrahydrofurans which comprises
  (a) reacting myrcene and a lower dialkyl itaconate in an inert atmosphere at a temperature between about 100° C. and about 170° C., thereby forming a methylpentenyl carboalkoxy methanocarboalkoxy cyclohexene wherein the said carboalkoxy group and the said methanocarboalkoxy group are attached to the same carbon atom of the cyclohexene ring,
  (b) heating the dicarboalkoxy substituted methylpentenyl cyclohexene compound of step (a) in the presence of a cyclization catalyst which comprises a strong acid, thereby converting the said substituted methylpentenyl cyclohexene compound into a corresponding dicarboalkoxy substituted dimethyl octahydronaphthalene compound,
  (c) reducing the two carboalkoxy substituents of the dimethyl octahydronaphthalene compound from step (b) to a methanohydroxy group and an ethanohydroxy group respectively,
  (d) refluxing the dihydroxy substituted dimethyl octahydronaphthalene compound from step (c) in the presence of a strong acid selected from the group consisting of toluene sulfonic acid, sulfuric acid and phosphoric acid and thereby dehydrating said dihydroxy substituted dimethyl octahydronaphthalene compound and forming a dimethyl octahydronaphthospirotetrahydrofuran compound therefrom, and
  (e) hydrogenating said dimethyl octahydronaphthospirotetrahydrofuran compound to convert it to the corresponding dimethyl perhydronaphthospirotetrahydrofuran.

6. A process according to claim 5 wherein hydroquinone is used as a polymerization inhibitor in step (a).

7. A process according to claim 5 wherein the dialkyl itaconate used in step (a) is di-n-propyl itaconate.

8. A process according to claim 5 wherein the step (a) is carried out at a temperature between about 150° C. and 170° C. and wherein boron trifluoride etherate is used as the cyclization catalyst in step (b).

References Cited
UNITED STATES PATENTS 2,933,506  4/1960  Ohloff _____ 260—343.2

NICHOLAS S. RIZZO, *Primary Examiner.*

B. DENTZ, *Assistant Examiner.*

U.S. Cl. X.R.

260—468, 618; 167—094